United States Patent [19]
Stettner et al.

[11] Patent Number: 5,501,096
[45] Date of Patent: Mar. 26, 1996

[54] CALIBRATION METHOD FOR DETERMINING AND COMPENSATING DIFFERENCES OF MEASURING FORCES IN DIFFERENT COORDINATE DIRECTIONS IN A MULTI-COORDINATE SCANNING SYSTEM

[75] Inventors: Rudolf Stettner, Trostberg; Kurt Feichtinger, Palling, both of Germany

[73] Assignee: Dr. Johannes Heidenhain GmbH, Traunreut, Germany

[21] Appl. No.: 286,828

[22] Filed: Aug. 5, 1994

[30] Foreign Application Priority Data

Aug. 7, 1993 [DE] Germany .......................... 43 26 551.0

[51] Int. Cl.⁶ .................. G01B 5/03; G01D 3/04; G01D 18/00; G01L 5/18
[52] U.S. Cl. .................. 73/1 J; 73/865.8; 33/503; 33/644
[58] Field of Search .................. 73/1 B, 1 J, 865.8, 73/866.5; 33/503, 504, 505, 644

[56] References Cited

U.S. PATENT DOCUMENTS

| | | | |
|---|---|---|---|
| 4,523,450 | 6/1985 | Herzog | 73/1 J |
| 4,535,857 | 8/1985 | Haze | 73/1 B |
| 4,771,237 | 9/1988 | Daley | 73/1 J |
| 4,777,818 | 10/1988 | McMurtry | 73/1 J |
| 4,924,715 | 5/1990 | Schaffer | 73/865.8 |
| 4,962,591 | 10/1990 | Zeller et al. | 73/1 J |
| 4,982,504 | 1/1991 | Soderberg et al. | 73/1 J |
| 5,134,781 | 8/1992 | Baker | 73/1 J |
| 5,259,119 | 11/1993 | Yoshioka et al. | 73/1 J |

FOREIGN PATENT DOCUMENTS 3050013 3/1982 Germany .

OTHER PUBLICATIONS

Werner Lotze, Messende Taster mit mehreren Freiheitsgraden, 1992, 6 pages.
Master pieces for coordinate measuring . . . , H. Schussler, 1984, 13 pages.

*Primary Examiner*—Richard Chilcot
*Assistant Examiner*—George M. Dombroske
*Attorney, Agent, or Firm*—Anderson Kill Olick & Oshinsky

[57] ABSTRACT

A calibration method of determining and compensating differences of measuring forces in different coordinate directions in a measuring scanning system for use in a numerically controlled multi-coordinate measuring machine, which method includes the steps of inputting parameters of the scanning system and of a calibration gauge into a control unit of the multi-coordinate measuring machine, scanning calibrating surfaces of the calibrating gauge with the scanning system, with a scanning displacement being effected in a direction defined by two coordinate directions, superimposing on the initial scanning displacement another scanning displacement, which deviates from the initial displacement, and determining deviation displacement paths of the scanning system for determining differences of the measuring force in different coordinate directions and respective correction coefficients, which are inputted into the control unit of the coordinate measuring machine.

5 Claims, 2 Drawing Sheets

CALIBRATION METHOD FOR DETERMINING AND COMPENSATING DIFFERENCES OF MEASURING FORCES IN DIFFERENT COORDINATE DIRECTIONS IN A MULTI-COORDINATE SCANNING SYSTEM

BACKGROUND OF THE INVENTION

Multi-coordinate scanning systems are used as in multi-coordinate measuring machines for measuring test specimens so in machine tools for measuring workpieces. In machine tools, the scanning systems may be used for measuring workpieces because of the similarity of the mechanical structure and the kinematics of the numerically controlled machine tools and the multi-coordinate measuring machines. For use in the machine tools, a suitable three-dimensional scanning system should be appropriately adapted in both mechanical and signalization respects. A scanning system is located, instead of a tool, in a tool-exchange magazine and is replaced and positioned in the same manner as the tool. After the signalization system of the scanning system has been linked with the path measuring system of the machine tool, then the machine tool can be generally used as a coordinate measuring machine. The coordinate system of the machine tool, which serves as a spacial reference base, together with the path measuring system and the electronics of the three-coordinate scanning system, enable spacial measurements. However, a machine tool only then will be able to effect spatial measurements of a workpiece when the system geometrical errors of the spacial reference base, in particular, the displacement errors of the machine tool and the system errors of the measuring standard are determined and compensated during the measuring process. To this end, individual errors of the machine tool are determined with a suitable comparison measuring system, e.g., laser-interferometer, and are stored in the control system in the form of a correction matrix. In this case, the triplet of the coordinate of the path measuring system is processed together with the stored correction values. A microprocessor, which is integrated into machine tool control or is adapted for effecting same, converts the scanning coordinates into actual measurement of the workpiece, effects the calculation of the set-actual value deviation and transmits the results to peripheral units and to the last stage of calculation for providing corrected NC-data for compensating the machining errors.

For determination of the corrected NC-data, the parameters of the three-dimensional scanning system should be take into account.

An essential element of the scanning system is a spring-biased tracer pin which can be displaced along a predetermined path. If the displacement of the feeler ball can be registered within the spacer pin stroke, then a measuring scanning system becomes available.

After each spacer pin exchange, calibration should take place because, due to the mechanics of the scanning system, the measuring forces in the directions of different coordinates are different and, therefore, the tracer pin length and its deformation during the measuring process should be compensated. In particular, the calibration becomes necessary because of different spring rates, which determine the force/path relationship during the displacement of the tracer pin.

Accordingly, the object of the invention is a method of and an apparatus for effecting calibration, which facilitate the calibration process and improves the results of the calibration process.

SUMMARY OF THE INVENTION

This and other objects of the invention, which will become apparent herein after achieved by providing a method of determining and compensating differences of measuring forces in different directions in a measuring scanning system for use in a numerically controlled multi-coordinate measuring machine, which method includes inputting parameters of the scanning system into a control unit of the multi-coordinate measuring machine, providing a calibration gauge and inputting parameters thereof into the control unit, and scanning calibrating surfaces of the calibration gauge with the scanning system, with a scanning displacement being effected in a direction defined by two coordinate directions. According to the inventive method, a displacement, which deviates from the initial scanning displacement, is superimposed on the initial scanning displacement, and on a basis of the deviation displacement paths, differences of the measuring force in different coordinate directions and respective correction coefficients are determined and input into the control unit of the measuring machine, which control unit effects automatic compensation of measuring errors of the scanning system.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
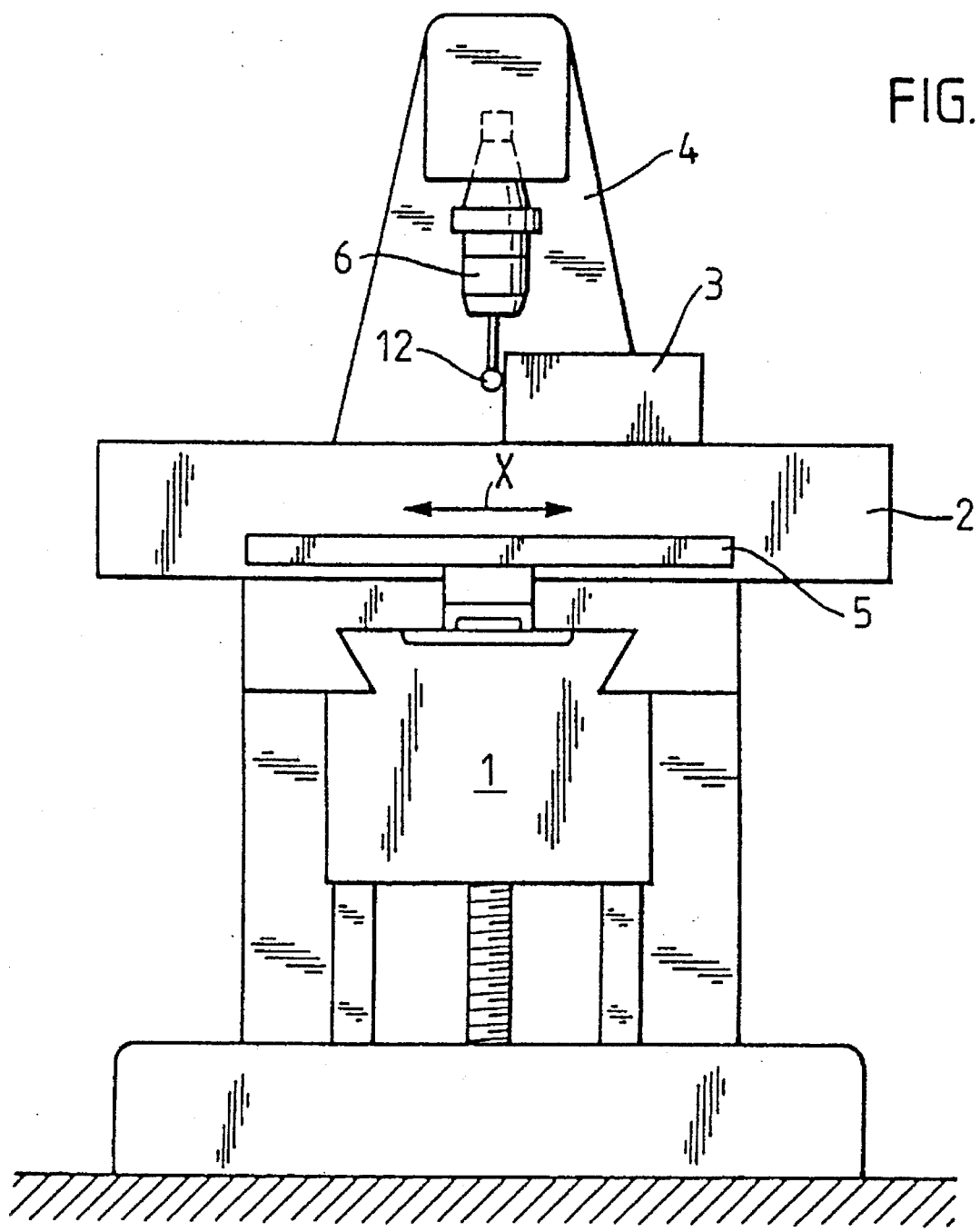
FIG. 1 shows a schematic view of a three-coordinate measuring machine.

FIG. 1 shows a conventional three-coordinate measuring machine 1 for measuring a test object. The three-coordinate measuring machine 1 has a table 2 for supporting a master piece 3. The table 2 is displaceable on a machine column 4, along three orthogonal axes of the measuring machine. For measuring the displacement of the table 2, together with the master piece 3, the measuring machine 1 is provided with linear encoders 5. For scanning the surfaces of the master piece 3, a scanning device 6, which operates along the three axes of the measuring machine 1, is secured on the column 6.

Figure 2:
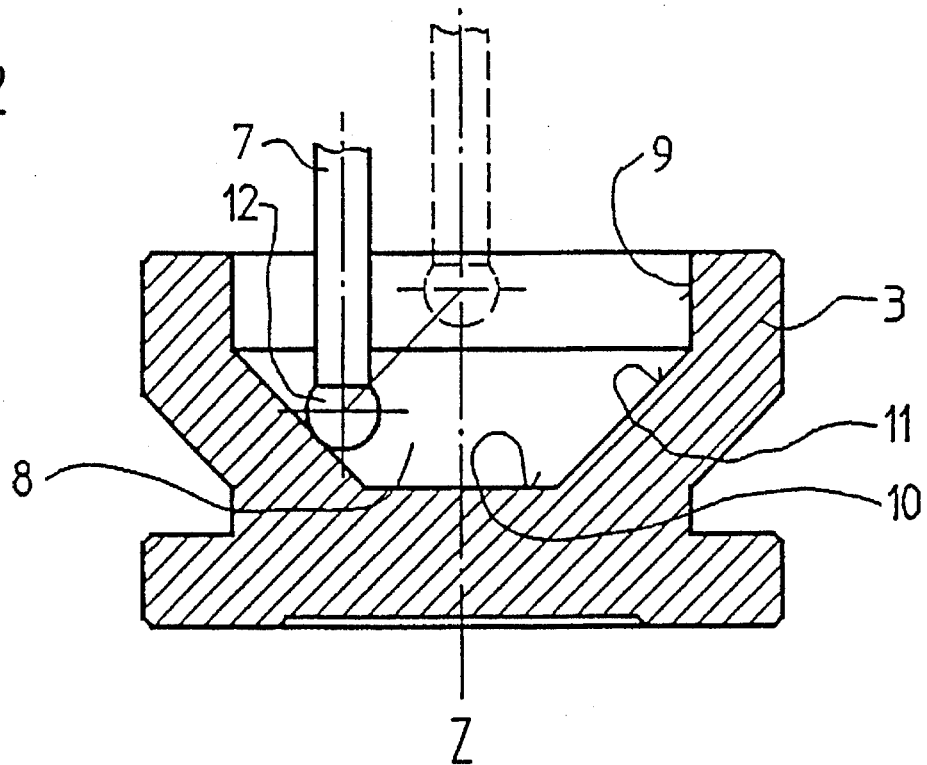
FIG. 2 shows a cross-sectional view of a calibration gauge for effecting the method according to the present invention.
Figure 3:
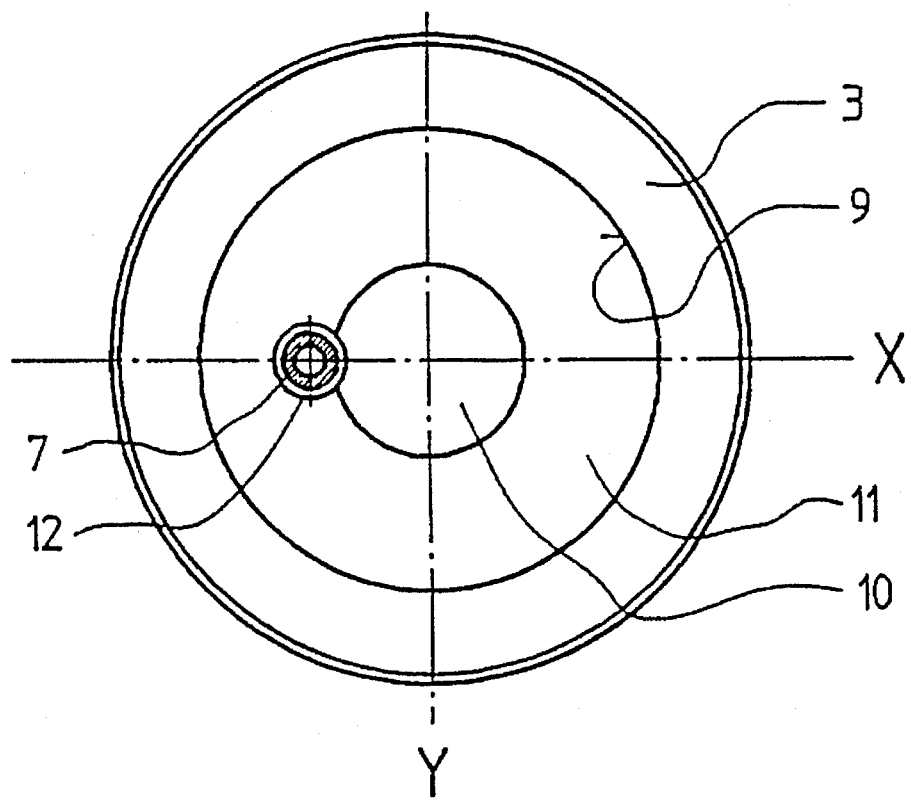
FIG. 3 shows a plan view of the calibrating gauge shown in FIG. 2.

A master piece 3, which represents a calibrating gauge, is shown in FIGS. 2 and 3. The scanning device 6 includes a tracer pin 7.

The calibrating gauge 3 has a bore defined by a cylindrical annular surface 9, bottom 10 and a conical surface 11.

For effecting calibration process, different data, such as parameters of the multi-coordinate scanning device 6 and those of the calibrating gauge 3 need be provided. Among the most important parameters are a radius of a feeler ball 12 and a radius of the cylindrical surface 9. It is especially advantageous when the depth of the bore 8 of the calibrating gauge 3, that is the distance between the planes of the bottom 10 and the end surface is selected so that it is equal to the radius of the annular surface 9. In this case, course of the calibration cycle does not depend on the diameter of the feeler ball 12 after the course has been determined and stored because the equality of the depth and the radius of the annular surface 9 simplifies the course of the calibration cycle.

After the tracer pin 7 of the scanning device 6 is positioned on the bottom 10 of the calibrating gauge 3, the calibration cycle begins with scanning displacement in Z-direction. After a following backward movement to a predetermined height of the annular surface 9, the annular surface is scanned in −X, +X, −Y, +Y directions whereby a center of the calibrating gauge 3 is determined and in which the feeler ball 12 is finally located.

By subsequent scanning of the annular surface 9 from the center thereof in the directions of the above-mentioned coordinates, a correction coefficient, for example, of the surface distortion is determined. After another displacement toward the center, scanning of the conical surface 11 starts, with the scanning direction extending perpendicular to the conical surface 11. The scanning is, thus, effected ones in plane X/Y and once in plane Y/Z.

With this scanning, the resulting deviation of the tracer pin leads to different deviations along coordinates X/Z or Y/Z, which are essentially transmitted back to the mechanics of the multi-coordinate scanning device 6.

The scanning process results in occurrence of undefined friction forces which make the exact compensation of different measuring forces more difficult. The measuring forces are inversely proportional to the deviation paths, however, friction distorts them.

In order to reduce influence of the friction forces, a second scanning displacement is superimposed on the initial displacement, so that the friction disappears or, at least, is substantially reduced.

The displacement, which is superimposed on the initial scanning displacement, should take place in a direction, which is different from the initial scanning direction, for example, transverse to the initial scanning direction. Also, a slight vibration may be used to eliminate the friction.

After the influence of friction forces is eliminated or is substantially reduced, the measuring forces can be determined by determining the deviation displacement path. The so determined correction values at the end of the calibration step are input into the control system of the measuring machine, so that the errors of the measuring machine can be automatically compensated.

In necessary, the calibration process can be restored after an accidental current cut-off or after turning-off or turning on of the measuring process.

The restoration process is the same as used in incremental measuring systems.

After being turned-on, the scanning system is in an unknown arbitrary position and, therefore, arbitrary position values are generated or stored in the control system of the measuring machine.

In order to determine this position with reference to a fixed point, the scanning system or device is displaced in all relevant coordinate directions across respective reference marks. This displacement leads to nullification of all arbitrary generated measuring values and their erasure from a respective storage. Thereafter, the scanning device is returned to its initial position.

At that, the distance between the reference mark and the initial position is measured and stored in an appropriate storage.

This distance represents a value which is taken into consideration during calculation, together with later obtained measuring values, as it represents actual position deviation of the scanning device from the reference mark representing the theoretical zero-position of the scanning device.

It is very advantageous to use this option after turning on the three-coordinate measuring machine.

While the present invention was shown and described with reference to a preferred embodiment, various modifications will be apparent to those skilled in the art and, therefore, it is not intended that the invention be limited to the disclosed embodiment or details thereof, and departures may be made therefrom within the spirit and scope of the appended claims.

What is claimed is:

1. A calibration method of compensating differences of measuring forces in different coordinate directions in a measuring scanning system for use in a numerically controlled multi-coordinate measuring machine and including a tracer pin, said method comprising the steps of:

inputting parameters of the scanning system into a control unit of the multi-coordinate measuring machine;

providing a calibrating gauge and inputting parameters thereof into the control unit;

scanning calibrating surfaces of the calibrating gauge with the tracer pin, with a first scanning displacement being effected in a direction defined by two coordinate directions;

superimposing on the first scanning displacement a second scanning displacement in a direction which deviates from the direction of the first scanning displacement;

determining deviation displacement paths of the scanning system;

determining, on a basis of the deviation displacement paths, differences of the measuring forces in different coordinate directions and respective correction coefficients;

inputting the correction coefficients into the control unit;

automatically compensating measuring errors of the scanning system with the control unit; and restoring the calibration process after accidental turning-off of the scanning system;

wherein the restoring step includes:
displacing the scanning system from a stop position thereof along at least one coordinate across a reference mark;
erasing an accidental measurement value in a reference mark position of the scanning system;
returning the scanning system to the stop position; and
determining a distance between the reference mark and the stop position and storing the distance in a storage of the control unit.

2. A calibration method of compensating differences of measuring forces in different coordinate directions in a measuring scanning system, which includes a tracer pin, for use in a numerically controlled multi-coordinate measuring machine, said method comprising the steps of:

inputting parameters of the scanning system into a control unit of the multi-coordinate measuring machine;

providing a calibrating gauge and inputting parameters thereof into the control unit;

scanning calibrating surface of the calibrating gauge with the tracer pin with a first scanning displacement being effected in a first direction defined by two coordinate directions;

superimposing on the first scanning displacement a second scanning displacement in a second direction, which deviates from the first direction;

determining deviation displacement paths of the scanning system;

determining, on a basis of the deviation displacement paths, differences of the measuring forces in different coordinate directions and respective correction coefficients;

inputting the correction coefficients into the control unit; and automatically compensating measuring errors of the scanning system with the control unit;

wherein said second scanning displacement comprises a linear displacement effected at an orthogonal angle to the first direction.

3. A method as set forth in claim 2, wherein said superimposing step includes superimposing a vibration movement onto the initial measuring displacement.

4. A method as set forth in claim 2, further including the step of restoration of a calibration process after accidental turning-off of the scanning system.

5. A calibrating gauge for determining measuring forces in different coordinate directions in a measuring scanning system for use in a numerically controlled multi-coordinate measuring machine, said gauge comprising an annular standard having a body and a bore formed in the body, said bore having a cylindrical annular surface, a bottom spaced from the cylindrical annular surface having a radius smaller than a radius of the cylindrical annular surface, and a conical surface extending between the bottom and the cylindrical annular surface, wherein the bore has a depth which is equal to the radius of the cylindrical annular surface.

* * * * *